July 17, 1928.

O. F. TAPLEY 1,677,375

METAL FINISHING MACHINE

Filed March 24, 1927

Patented July 17, 1928.

1,677,375

UNITED STATES PATENT OFFICE.

OSBORNE F. TAPLEY, OF NEW YORK, N. Y.

METAL-FINISHING MACHINE.

Application filed March 24, 1927. Serial No. 178,116.

My invention relates to metal finishing machines particularly to the semi-portable type which employ a driving motor and a flexible shaft connected thereto having a tool secured to a hand chuck on the end thereof. Such machines are commonly used to burnish and polish articles having irregular shapes.

Machines of this type run at relatively high speeds and when in operation are subject to considerable vibration which make it necessary to take measures to secure the entire machine to its support. These machines are also subject to whipping and serpentine action of the flexible shaft which is very annoying and a hindrance to the proper manipulation of the tool by the operator.

It is the purpose of this invention to eliminate all vibration of the machine and eliminate the whipping and tortional twisting action of the flexible shaft and its sheath and provide a machine of light weight and of portable characteristics that require no fastening means whatever to hold it in place.

It has been attempted to eliminate these objectional features by carefully balancing the motors and by extending the point of attachment of the flexible shaft to a point removed from the motor bearings but such expediencies have proved unsatisfactory.

In accordance with my invention I provide a rigid base for the machine and rigidly support a substantial length of the end portion of the flexible shaft attached to the motor shaft to permit rotation of the shaft but to prevent lateral movement relative to the motor and relative to the longitudinal axis of the shaft and also endwise movement of the shaft. This is accomplished by providing an extended base for the motor which base carries spaced bearing supports for a rigid tubular member through which the end portion of the flexible shaft is passed before attachment of the motor shaft.

Figure 1:
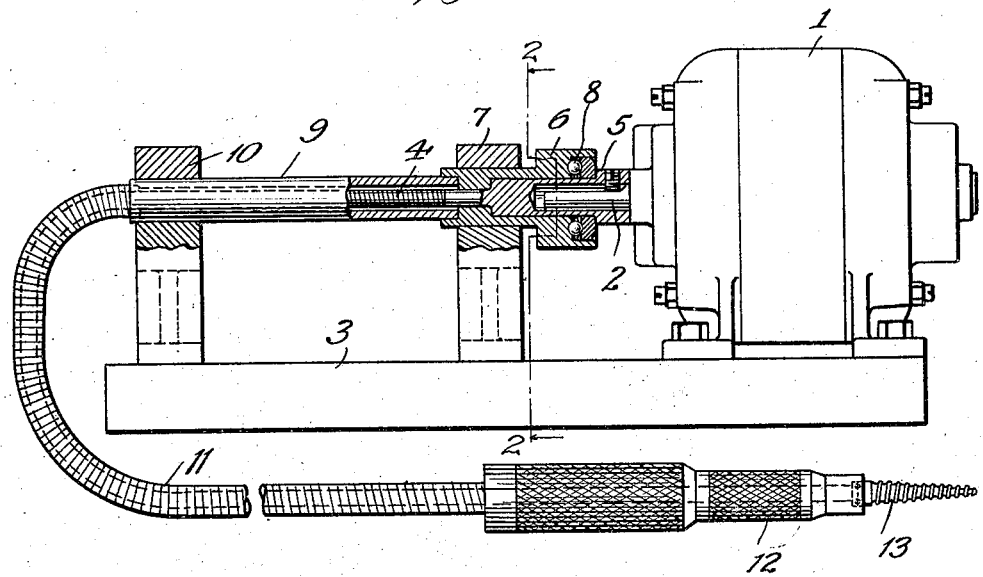
Figure 2:
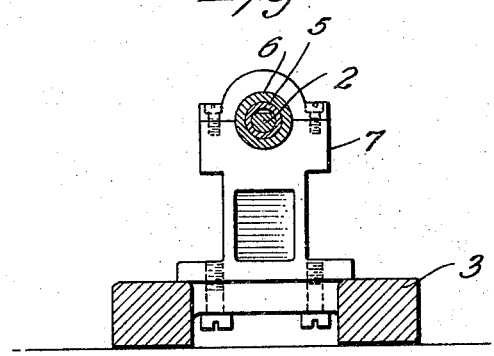

A more detailed description will now be given in connection with the drawings, in which:

Fig. 1 is a side elevation partly in section of a machine constructed in accordance with this invention, and Fig. 2 is a section on line 2—2 of Fig. 1.

A small high speed motor 1 of standard construction having an armature shaft 2 rotatively supported by bearings in the end plates of the motor housing is securely mounted upon one end of a bed or base 3 which extends a substantial distance parallel to and beyond the armature shaft. The usual flexible shaft 4 is attached to one end of the armature shaft by a coupling member 5 which is rotatably mounted within a bushing 6 rigidly supported in a bearing support 7 fastened to the bed adjacent one end of the motor. Bushing 6 is recessed at the motor end to receive a thrust bearing 8 to take care of the end thrust of the flexible shaft.

The other end of bushing 6 is recessed to receive one end of a rigid tubular sleeve 9 which surrounds the flexible shaft for a substantial portion of its length and extends from bushing 6 to the end of the bed 3 where it is firmly held by a second bearing support 10 fast upon the end of the bed.

A flexible sheath 11 is attached to the outer end of the tubing and surrounds the flexible shaft for the remainder of its length. A hand piece 12 having the usual hand grip and thrust bearing is attached to the outer end of the flexible sheath. The flexible shaft terminates just short of the hand piece and has the usual clutch or threaded end 13 thereon adapted to receive any desired burnishing tool.

It has been found that by rigidly supporting the end of the flexible shaft between the two spaced bearing supports, one of which is near the point of attachment to the armature shaft, any possibility of tortional whipping action is arrested between the two supports and at the very point of application of torque to the flexible shaft. This results not only in a complete elimination of the customary whipping or snakelike serpentine movements of the sheath and shaft but also in the elimination of all vibration of the entire machine thus making it possible to place the machine unsecured upon a support.

It is obvious that minor changes may be made in the details of construction without departing from the spirit and scope of the invention as defined in the claims.

I claim:

I. In a metal finishing machine, a base, a motor secured to one end thereof, spaced bearing supports mounted on said base one adjacent said motor and one removed therefrom, a flexible shaft operatively connected to said motor and passing through said supports and a rigid tube surrounding said shaft between said supports and rigidly connected thereto.

2. In a metal finishing machine, a base, a motor secured to one end thereof, a flexible shaft operatively connected at one end to said motor and adapted to receive a tool upon the other end, a pair of spaced bearing supports for said shaft mounted on said base, a rigid tube joining said supports and surrounding said shaft for restricting a portion thereof from lateral motion between said supports while permitting rotation therein.

3. In a metal finishing machine, a base, a motor secured to one end thereof, a flexible shaft operatively connected at one end to said motor and adapted to receive a tool upon the other end, a pair of bearing supports for said shaft mounted on said base, one adjacent said motor and one removed therefrom, a rigid tube connecting and secured to said supports and surrounding said shaft for restricting a portion of said shaft from lateral motion between said support while permitting rotation therein.

4. In a metal finishing machine, a base, a motor secured to one end thereof, a flexible shaft operatively connected at one end to said motor and adapted to receive a tool at the other end, a pair of bearing supports for said shaft mounted upon said base one adjacent said motor and one removed therefrom, a rigid tube connecting said supports and a thrust bearing carried by one of said supports whereby the section of shaft between said supports is rigidly supported and restricted from axial and lateral movement but free for rotative movement.

In witness whereof, I hereunto subscribe my signature.

OSBORNE F. TAPLEY.